US011941032B2

(12) United States Patent
Hou

(10) Patent No.: US 11,941,032 B2
(45) Date of Patent: Mar. 26, 2024

(54) KEY NAME GENERATION METHOD AND APPARATUS AND NON-TRANSITORY COMPUTER-READABLE STORAGE MEDIUM

(71) Applicant: Shandong Yingxin Computer Technologies Co., Ltd., Jinan (CN)

(72) Inventor: Zhili Hou, Jinan (CN)

(73) Assignee: Shandong Yingxin Computer Technologies Co., Ltd., Shandong (CN)

( * ) Notice: Subject to any disclaimer, the term of this patent is extended or adjusted under 35 U.S.C. 154(b) by 0 days.

(21) Appl. No.: 18/270,113

(22) PCT Filed: Apr. 22, 2022

(86) PCT No.: PCT/CN2022/088578
§ 371 (c)(1),
(2) Date: Jun. 28, 2023

(87) PCT Pub. No.: WO2022/223038
PCT Pub. Date: Oct. 27, 2022

(65) Prior Publication Data
US 2024/0045888 A1 Feb. 8, 2024

(30) Foreign Application Priority Data
Apr. 23, 2021 (CN) .......................... 202110441196.8

(51) Int. Cl.
*G06F 17/30* (2006.01)
*G06F 16/22* (2019.01)
(Continued)

(52) U.S. Cl.
CPC ........ *G06F 16/284* (2019.01); *G06F 16/2282* (2019.01); *G06F 16/24552* (2019.01)

(58) Field of Classification Search
CPC .......... G06F 16/11; G06F 16/13; G06F 16/24; G06F 16/156; G06N 3/00; G06N 5/00; G05B 13/00
See application file for complete search history.

(56) References Cited

U.S. PATENT DOCUMENTS 8,904,047 B1 * 12/2014 Kornfeld ................. G06F 16/22
710/7
9,798,752 B1 * 10/2017 Naffziger ............ G06F 16/2282
(Continued)

FOREIGN PATENT DOCUMENTS

| CN | 108681589 A | 10/2018 |
|---|---|---|
| CN | 110659282 A | 1/2020 |

(Continued)

OTHER PUBLICATIONS

International Search Report dated Jul. 5, 2022; International Application PCT/CN2022/088578.
(Continued)

*Primary Examiner* — Hung D Le
(74) *Attorney, Agent, or Firm* — DINSMORE & SHOHL LLP

(57) ABSTRACT

A key name generation method includes constructing a member structure library according to a set data structure template and member categories contained in various types of components, wherein the member structure library contains member structure information corresponding to each member category; upon acquiring a reading instruction for data, retrieving, from the member structure library on the basis of a data identifier carried in the reading instruction for the data, target member structure information matching the data identifier; and determining, on the basis of the target member structure information and a structure array identifier contained therein, key description information corresponding to the target member structure information, and taking
(Continued)

the key description information as a key name of the data. A key name generation apparatus and a medium are also disclosed herein.

20 Claims, 2 Drawing Sheets

(51) Int. Cl.
*G06F 16/2455* (2019.01)
*G06F 16/28* (2019.01)

(56) References Cited

U.S. PATENT DOCUMENTS

| | | | | |
|---|---|---|---|---|
| 11,308,058 | B1* | 4/2022 | Jiang | G06F 16/2264 |
| 2006/0294088 | A1 | 12/2006 | Stecher et al. | |
| 2013/0226971 | A1* | 8/2013 | Shoolman | G06F 16/2228 707/790 |
| 2013/0339366 | A1* | 12/2013 | Khimich | G06F 16/215 707/741 |
| 2014/0214897 | A1* | 7/2014 | Zhu | G06F 16/2455 707/771 |
| 2015/0205885 | A1* | 7/2015 | Zhou | G06F 16/81 707/742 |
| 2016/0125004 | A1* | 5/2016 | Chen | G06F 16/93 707/741 |
| 2016/0275201 | A1 | 9/2016 | Li et al. | |
| 2017/0161352 | A1* | 6/2017 | Horii | G06F 16/283 |
| 2017/0169061 | A1* | 6/2017 | Cao | G06F 16/211 |
| 2017/0185636 | A1* | 6/2017 | Horii | G06F 16/951 |
| 2017/0286527 | A1* | 10/2017 | Li | G06F 16/24556 |
| 2017/0357687 | A1* | 12/2017 | Bulkowski | G06F 11/14 |
| 2018/0018365 | A1 | 1/2018 | Hanusiak et al. | |
| 2018/0150503 | A1* | 5/2018 | Horii | G06F 11/3419 |
| 2018/0253562 | A1 | 9/2018 | Antonatos et al. | |
| 2018/0260435 | A1* | 9/2018 | Xu | G06F 16/275 |
| 2019/0087431 | A1* | 3/2019 | Qiu | G06F 16/13 |
| 2019/0171532 | A1* | 6/2019 | Abadi | H04L 67/1095 |
| 2019/0303481 | A1* | 10/2019 | Jiang | G06F 16/2456 |
| 2020/0175018 | A1* | 6/2020 | Kommera | G06F 9/546 |
| 2020/0320075 | A1* | 10/2020 | Yan | G06F 16/24549 |
| 2021/0042174 | A1* | 2/2021 | Dayan | H04L 67/564 |
| 2021/0149865 | A1* | 5/2021 | Wu | G06F 16/2272 |
| 2021/0342316 | A1* | 11/2021 | McPherson | G06F 16/2282 |
| 2021/0385187 | A1* | 12/2021 | Hu | H04L 67/02 |
| 2022/0337561 | A1* | 10/2022 | Kulkarni | G06F 16/211 |

FOREIGN PATENT DOCUMENTS

| | | |
|---|---|---|
| CN | 111291024 A | 6/2020 |
| CN | 111367584 A | 7/2020 |
| CN | 111506559 A | 8/2020 |
| CN | 111797073 A | 10/2020 |
| CN | 111930642 A | 11/2020 |
| CN | 113127490 A | 7/2021 |
| WO | 0157725 A2 | 8/2001 |
| WO | 2021164425 A1 | 8/2021 |
| WO | 2022/223038 A1 | 10/2022 |

OTHER PUBLICATIONS

Written Opinion International Application No. PCT/CN2022/088578.
The First Office Action of corresponding Chinese Application 2021104411968.
Notification to Grant Patent Right of corresponding Chinese application 202110441196.8.

* cited by examiner

KEY NAME GENERATION METHOD AND APPARATUS AND NON-TRANSITORY COMPUTER-READABLE STORAGE MEDIUM

This application claims priority to Chinese patent application No. 202110441196.8, filed with the China National Intellectual Property Administration on Apr. 23, 2021 and entitled "KEY NAME GENERATION METHOD AND APPARATUS AND COMPUTER-READABLE STORAGE MEDIUM", the disclosure of which is hereby incorporated by reference in its entirety.

TECHNICAL FIELD

The present application relates to the technical field of data reading and writing, in particular to a key name generation method and apparatus and a computer-readable storage medium.

BACKGROUND

The Redis database, a high-performance key-value pair database, has been now widely used in a variety of embedded systems. The Redis database has a high access speed, is easy to use and comes with a mutual exclusion mechanism. Each access operation is an atomic operation, which ensures the synchronization and integrity of accessed data. Moreover, the Redis database provides a variety of programming language interfaces to the outside world, making it easy to operate and program.

Since the Redis database is a key-value pair database, it is especially important to define and describe a key to which accessed data belongs. At present, the method for realizing the key description of a Redis database is as follows: defining, in a header file, key descriptions that are stored in a Redis; when there is a need to access data in a Redis database, temporarily performing combination according to definitions of keys in the header file to obtain a desired key description; then directly connecting the Redis database, and sending a command to complete a data access operation; and then disconnecting from the Redis database.

However, this mode of operation has a shortcoming, that is, when a Redis database is used as a mode of communication between different processes in a system, because the structures of data that different processes need to access vary greatly, the keys that are defined are also diverse and lack uniformity. Moreover, when you need to access a certain data structure, you have to know combinations of keys for all members of this data structure, which undoubtedly increases the difficulty and workload of development.

Hence, how to achieve the unified management of key names so that a Redis database can be easily accessed is a problem to be solved by a person skilled in the art.

SUMMARY OF THE INVENTION

The embodiments of the present application aim to provide a key name generation method and apparatus and a computer-readable storage medium by means of which the unified management of key names can be achieved so that a Redis database can be easily accessed.

In order to solve the above technical problem, provided in the embodiments of the present application is a key name generation method, comprising:

constructing a member structure library according to a set data structure template and member categories contained in various types of components, wherein the member structure library contains member structure information corresponding to each member category;

upon acquiring a reading instruction for data, retrieving, from the member structure library on the basis of a data identifier carried in the reading instruction for the data, target member structure information matching the data identifier; and determining, on the basis of the target member structure information and a structure array identifier contained therein, key description information corresponding to the target member structure information, and taking the key description information as a key name of the data.

Optionally, the step of constructing a member structure library according to a set data structure template and member categories contained in various types of components comprises:

setting structure information corresponding to each type of components according to the set data structure template; and classifying the structure information according to member categories contained in the structure information, so as to obtain member structure information corresponding to each member category.

Optionally, the step of determining, on the basis of the target member structure information and a structure array identifier contained therein, key description information corresponding to the target member structure information comprises:

judging whether the target member structure information contains a structure array identifier;

if there is first target member structure information containing a structure array identifier, filling the first target member structure information on the basis of a member serial number contained in a data instruction;

taking the filled first target member structure information together with member structure information that does not contain a structure array identifier as second target member structure information, and judging whether the second target member structure information is dependent on other member structure information;

if the second target member structure information is dependent on other member structure information, splitting the target member structure information on the basis of a start parameter and an end parameter that are contained in the target member structure information, so as to acquire target member substructure information; and taking the target member substructure information as key description information; and if the second target member structure information is not dependent on other member structure information, taking the second target member structure information as key description information.

Optionally, the method further comprises:

upon acquiring a structure expansion instruction carrying a member category and member information, constructing a member structure information table according to the set data structure template and the member category carried in the structure expansion instruction; and adding the member structure information table into the member structure library.

Optionally, the method further comprises:

upon acquiring an addition instruction carrying target member information, adding the target member information to the member structure information corresponding to each member category in the member structure library.

Optionally, the method further comprises:

upon acquiring a deletion instruction carrying target member information, deleting the target member information contained in the member structure information corresponding to each member category in the member structure library.

Optionally, the method further comprises:

storing the key name of the data into a preset cache area, such that corresponding data can be acquired from a Redis database according to the key name stored in the cache area.

Further provided in the embodiments of the present application is a key name generation apparatus, which comprises a construction unit, a matching unit, an acquisition unit and a serving unit;

the construction unit being configured to construct a member structure library according to a set data structure template and member categories contained in various types of components, wherein the member structure library contains member structure information corresponding to each member category;

the matching unit being configured to retrieve, upon acquiring a reading instruction for data, from the member structure library on the basis of a data identifier carried in the reading instruction for the data, target member structure information matching the data identifier;

the acquisition unit being configured to determine, on the basis of the target member structure information and a structure array identifier contained therein, key description information corresponding to the target member structure information; and the serving unit being configured to take the key description information as a key name of the data.

Optionally, the construction unit comprises a setting subunit and a classification subunit;

the setting subunit being configured to set structure information corresponding to each type of components according to the set data structure template; and the classification subunit being configured to classify the structure information according to member categories contained in the structure information, so as to obtain member structure information corresponding to each member category.

Optionally, the acquisition unit comprises a first judgment subunit, a filling subunit, a second judgment subunit, a splitting processing subunit, a first serving subunit and a second serving subunit;

the first judgment subunit being configured to judge whether the target member structure information contains a structure array identifier;

the filling subunit being configured to fill, if there is first target member structure information containing a structure array identifier, the first target member structure information on the basis of a member serial number contained in a data instruction;

the second judgment subunit being configured to take the filled first target member structure information together with member structure information that does not contain a structure array identifier as second target member structure information, and to judge whether the second target member structure information is dependent on other member structure information;

the splitting processing subunit being configured to split, if the second target member structure information is dependent on other member structure information, the target member structure information on the basis of a start parameter and an end parameter that are contained in the target member structure information, so as to acquire target member substructure information;

the first serving subunit being configured to take the target member substructure information as key description information; and the second serving subunit being configured to take, if the second target member structure information is not dependent on other member structure information, the second target member structure information as key description information.

Optionally, the apparatus further comprises an expansion unit;

the construction unit being configured to construct, upon acquiring a structure expansion instruction carrying a member category and member information, a member structure information table according to the set data structure template and the member category carried in the structure expansion instruction; and the expansion unit being configured to add the member structure information table into the member structure library.

Optionally, the apparatus further comprises an addition unit;

the addition unit being configured to add, upon acquiring an addition instruction carrying target member information, the target member information to the member structure information corresponding to each member category in the member structure library.

Optionally, the apparatus further comprises a deletion unit;

the deletion unit being configured to delete, upon acquiring a deletion instruction carrying target member information, the target member information contained in the member structure information corresponding to each member category in the member structure library.

Optionally, the apparatus further comprises a storage unit;

the storage unit being configured to store the key name of the data into a preset cache area, such that corresponding data can be acquired from a Redis database according to the key name stored in the cache area.

Further provided in the embodiments of the present application is a key name generation apparatus, comprising:

a memory, configured to store a computer program; and a processor, configured to execute the computer program to implement the steps of any one of the above-mentioned key name generation methods.

Further provided in the embodiments of the present application is a computer-readable storage medium, wherein the computer-readable storage medium stores a computer program thereon, and the computer program, when executed by a processor, implements the steps of any one of the above-mentioned key name generation methods.

As can be seen from the above technical solution, a member structure library is constructed according to a set data structure template and member categories contained in various types of components, wherein the member structure library contains member structure information corresponding to each member category. The data structure template may be set according to a generic structure of the components. Upon acquiring a reading instruction for data, on the basis of a data identifier carried in the reading instruction for the data, target member structure information matching the data identifier is retrieved from the member structure library. The target member structure information is member structure information that is obtained by unified planning on the basis of the data structure template. Since the target member structure information corresponding to different components differs, when the member structure library is constructed, a structure array identifier can be set for member structure information having a splitting requirement, and after the target member structure information is acquired, key description information corresponding to the target member structure information can be determined on the basis of the target member structure information and a structure array identifier contained therein, and the key description information is taken as a key name of the data. In the technical solution, the unified management of key names can be achieved on the basis of a generic data structure template. According to the solution, data of an entire structure can be accessed, any one of members therein can also be accessed, and any element of a structure array or members within the element range can even be accessed, such that the access to a Redis database is made easy.

BRIEF DESCRIPTION OF THE DRAWINGS

To illustrate the embodiments of the present application more clearly, the accompanying drawings required for use in the embodiments will be briefly described hereinafter. It is apparent that the accompanying drawings described hereinafter illustrate only some embodiments of the present application, and a person of ordinary skill in the art may still derive other drawings from these accompanying drawings without creative efforts.

DETAILED DESCRIPTION

The technical solutions in the embodiments of the present application will be clearly and completely described hereinafter with reference to the accompanying drawings in the embodiments of the present application. It is apparent that the described embodiments are merely a part rather than all of the embodiments of the present application. On the basis of the embodiments in the present application, all other embodiments obtained by those of ordinary skill in the art without creative efforts shall fall within the scope of protection of the present application.

To make those in the technical field better understand the solutions of the present application, the present application will be described hereinafter in further detail with reference to the accompanying drawings and particular embodiments.

Hereafter, a key name generation method provided in an embodiment of the present application will be described in detail.

Figure 1:
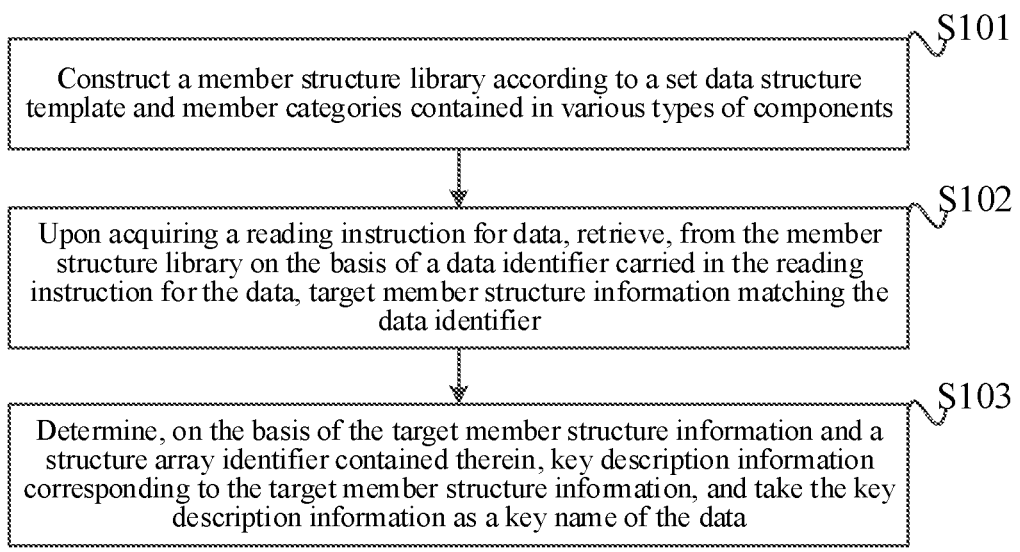
FIG. 1 is a flowchart of a key name generation method provided in an embodiment of the present application.

FIG. 1 is a flowchart of a key name generation method provided in an embodiment of the present application, the method comprising:

S101: Construct a member structure library according to a set data structure template and member categories contained in various types of components, wherein the member structure library contains member structure information corresponding to each member category.

The data structure template may be set according to a generic structure of the components. For example, the data structure template may comprise seven parts, which are the tag of a member (ParamSelect), the key description of a member (KeyFormatStr), the data type of a member (DataType), the number of bytes occupied by a member (MemberByteNum), the number of elements of a member (MemberArrayNum), a start parameter of a member (BelongMemberStart) and an end parameter of a member (BelongMemberEnd), respectively.

A generic data structure is defined as follows.
typedef
{
  UINT32 udwParamSelect;
  CHAR *pcKeyFormatStr;
  REDIS_DATA_TYPE eRedisDataType;
  UINT32 udwMemberByteNum;
  UINT32 udwMemberArrayNum;
  UINT32 udwBelongMemberStart;
  UINT32 udwBelongMemberEnd;
}REDIS_DATA_INFO_DESC;

Member category may be the content of data to be acquired. Taking a power supply unit (PSU) as an example, members contained therein may be classifyd into four categories, namely, acquiring information of an entire structure, acquiring Index information, acquiring SUBPSU information and acquiring STATUSWORD information. Member tags may be used to distinguish between different member categories.

In the embodiments of the present application, corresponding structure information can be set for each type of components according to a set data structure template. Since the data structure template is a generic template, the type of structure information corresponding to each component is the same, and only the specific content of the structure information under each type differs.

The structure information of the components is processed in a similar way. Taking the structure information of one component as an example, the structure information may be classifyd according to member categories contained in the structure information, so as to obtain member structure information corresponding to each member category.

In practical application, the member structure information corresponding to each component can be recorded in the form of a list.

Taking the following PSU information structure as an example (the prefix being PSU): typedef struct
{
  UINT 16 uwStatusWord;
} SUB_PSU_INFO_T;
typedef struct
{
  UINT8 ucPSUIndex;
  SUB_PSU_INFO_T stSubPSUInfo[32];
}PSU_INFO;

Table 1 is a list of member structure information of the PSU.

TABLE 1

| No. | Name | Meaning and application |
|-----|------|-------------------------|
| | ParamSelect | The unique tag of each member in the structure. By means of the tag, each process identifies which member of the structure needs to be accessed. Taking the PSU information structure as an example, this field is defined as follows:<br>enum<br>{<br>REDIS_PARAM_PSUINFO, //Acquire information of the entire structure<br>REDIS_PARAM_PSUINFO_PSUINDEX, //Acquire Index information<br>REDIS_PARAM_PSUINFO_SUBPSUINFO, //Acquire SUBPSU information<br>REDIS_PARAM_PSUINFO_SUBPSUINFO_STATUSWORD<br>}; |
| | KeyFormatStr | The key description regarding the member. There are certain rules regarding the key description of a member.<br>First, a key prefix is defined for a structure, and then each subsequent field is the name of a variable in the structure or in a substructure. When there is a substructure array in the structure, % d is added to the variable of the substructure as a tag to identify whether it is a structure array.<br>Taking the above PSU information as an example, the defined key description is as follows<br>(corresponding to paramselect):<br>"PSU: PSU_INFO%d"<br>"PSU: PSU_INFO%d: ucPSUIndex"<br>"PSU: PSU_INFO%d: stSubPSUInfo%d"<br>"PSU: PSU_INFO%d: stSubPSUInfo%d: uwStatus Word" |
| | DataType | The data type of a member. Taking the above PSU structure as an example, data types of members are as follows:<br>REDIS_DATA_TYPE_STRUCT_ARRAY, //structure array<br>REDIS_DATA_TYPE_UINT8, //unsigned char type<br>REDIS_DATA_TYPE_STRUCT_ARRAY, //structure array<br>REDIS_DATA_TYPE_UINT16, //unsigned short type |
| | MemberByteNum | The number of bytes occupied by a member. Taking the above PSU information as an example, the number of bytes occupied is as follows:<br>sizeof (PSU_INFO) * MAX_PSU_NUM,<br>sizeof (UINT8)<br>sizeof (SUB_PSU_INFO_T) * 32<br>sizeof (UINT16) |
| | MemberArrayNum | If it is a structure array, the number of elements of the structure array is described; and if it is not a structure array, it is represented as 1. The number of elements of the array of the above members is MAX_PSU_NUM, 1, 32 and 1 respectively. |
| | BelongMemberStart | For the case where the structure is composed of other members, for example,<br>REDIS_PARAM_PSUINFO, which is composed of<br>REDIS_PARAM_PSUINFO_PSUINDEX and<br>REDIS_PARAM_PSUINFO_SUBPSUINFO,<br>REDIS_PARAM_PSUINFO_PSUINDEX is filled here. |
| | BelongMemberEnd | For the case where the structure is composed of other members, for example,<br>REDIS_PARAM_PSUINFO, which is composed of<br>REDIS_PARAM_PSUINFO_PSUINDEX and<br>REDIS_PARAM_PSUINFO_SUBPSUINFO,<br>REDIS_PARAM_PSUINFO_SUBPSUINFO is filled here. |

Table 1 is an example of four categories of members. In practical application, the member structure information corresponding to the members in Table 1 can be combined into a Table, such that a recursive function can call different tables to implement the processing of key description.

Taking the example of acquiring the information of the entire structure in Table 1, the corresponding Table is as follows:
REDIS_DATA_INFO_DESC stPSUInfoTbl[ ]=
{
{REDIS_PARAM_PSUINFO,
"PSU: PSU_INFO % d",
REDIS_DATA_TYPE_STRUCT_ARRAY,
sizeof(PSU_INFO)*MAX_PSU_NUM,
MAX_PSU_NUM,
REDIS_PARAM_PSUINFO_PSUINDEX,
REDIS_PARAM_PSUINFO_SUBPSUINFO},
}

S102: Upon acquiring a reading instruction for data, retrieve, from the member structure library on the basis of a data identifier carried in the reading instruction for the data, target member structure information matching the data identifier.

The data identifier may be used to characterize data to be acquired, and the data identifier may comprise a component type and a member category. Matching member structure information can be retrieved from the member structure library on the basis of the data identifier. For ease of differentiation, the member structure information that matches the data identifier can be referred to as the target member structure information.

S103: Determine, on the basis of the target member structure information and a structure array identifier contained therein, key description information corresponding to the target member structure information, and take the key description information as a key name of the data.

In the embodiment of the present application, a recursive call function can be written to process the target member structure information.

The target member structure information is member structure information that is obtained by unified planning on the basis of a data structure template. Since the target member structure information corresponding to different components differs, when the member structure library is constructed, a structure array identifier can be set for member structure information having a splitting requirement, and after the target member structure information is acquired, key description information corresponding to the target member structure information can be determined on the basis of the target member structure information and a structure array identifier contained therein, and the key description information is taken as a key name of the data.

In practical application, whether the target member structure information contains a structure array identifier can be judged.

A member serial number may be contained in the reading instruction for the data. If there is first target member structure information containing a structure array identifier, the first target member structure information can be filled on the basis of the member serial number.

In view of the content of Table 1 that is numbered 2, when a member belongs to a splittable array, key description corresponding thereto contains "% d". In the embodiment of the present application, filling the first target member structure information is mainly a matter of replacing "% d" with "a member serial number".

The filled first target member structure information together with member structure information that does not contain a structure array identifier are taken as second target member structure information, and whether the second target member structure information is dependent on other member structure information is judged.

If the second target member structure information is dependent on other member structure information, it means that the second target member structure information belongs to array information and can be further split, and then the target member structure information can be split on the basis of a start parameter and an end parameter that are contained in the target member structure information, so as to acquire target member substructure information; and the target member substructure information is taken as key description information. If the second target member structure information is not dependent on other member structure information, the second target member structure information is taken as key description information.

In practical application, the members can be looped through according to BelongMemberStart and BelongMemberEnd, and a key description character string is filled using a last field that is obtained by splitting KeyFormatStr in each member.

In the embodiment of the present application, after the key name of the data is obtained, corresponding data can be acquired directly from a Redis database according to the key name. The key name of the data can also be stored into a preset cache area after the key name of the data is obtained, such that corresponding data can be acquired from the Redis database according to the key name stored in the cache area.

By storing key names into a cache area, batch processing of multiple key names can be realized.

As can be seen from the above technical solution, a member structure library is constructed according to a set data structure template and member categories contained in various types of components, wherein the member structure library contains member structure information corresponding to each member category. The data structure template can be set according to a generic structure of the components. Upon acquiring a reading instruction for data, on the basis of a data identifier carried in the reading instruction for the data, target member structure information matching the data identifier is retrieved from the member structure library. The target member structure information is member structure information that is obtained by unified planning on the basis of the data structure template. Since the target member structure information corresponding to different components differs, when the member structure library is constructed, a structure array identifier can be set for member structure information having a splitting requirement, and after the target member structure information is acquired, key description information corresponding to the target member structure information can be determined on the basis of the target member structure information and a structure array identifier contained therein, and the key description information is taken as a key name of the data. In the technical solution, the unified management of key names can be achieved on the basis of a generic data structure template. According to the solution, data of an entire structure can be accessed, any one of members therein can also be accessed, and any element of a structure array or members within the element range can even be accessed, such that the access to a Redis database is made easy.

In the embodiment of the present application, a member structure library can be expanded according to actual requirements. When a structure needs to be newly added, a user can input a structure expansion instruction to a system. When the system acquires a structure expansion instruction carrying a member category and member information, a member structure information table can be constructed according to a set data structure template and the member category carried in the structure expansion instruction; and the member structure information table is added into the member structure library.

The process of constructing the member structure information table can be found in the introduction of S101 and will not be described herein again.

In addition to expanding a member structure library, member information can also be added to or deleted from existing member structure information.

In practical application, when a system acquires an addition instruction carrying target member information, the target member information can be added to member structure information corresponding to each member category in a member structure library. When the system acquires a deletion instruction carrying target member information, the target member information contained in the member structure information corresponding to each member category in the member structure library can be deleted.

In the embodiment of the present application, when a structure is newly added, it is only necessary to newly add a member structure information table related to the structure correspondingly, without writing any code, thus improving the code reuse. When there is a need to expand an existing structure with a piece of member information, it is only necessary to add a record to the member structure information corresponding to each member category in the member structure library. When there is a need to delete a member from the existing structure, it is only necessary to delete a record from the member structure information corresponding to each member category in the member structure library.

Figure 2:
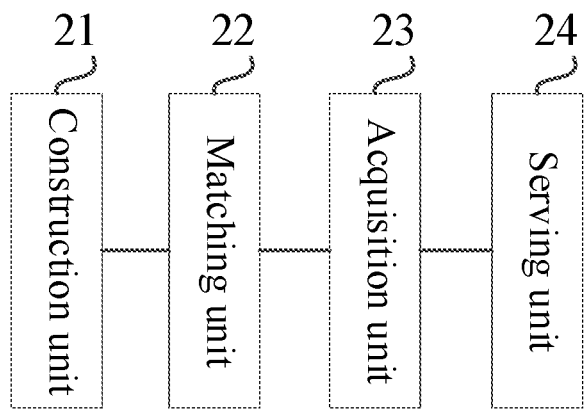
FIG. 2 is a structural schematic diagram of a key name generation apparatus provided in an embodiment of the present application.

FIG. 2 is a structural schematic diagram of a key name generation apparatus provided in an embodiment of the present application, comprising a construction unit 21, a matching unit 22, an acquisition unit 23 and a serving unit 24;

the construction unit 21 being configured to construct a member structure library according to a set data structure template and member categories contained in various types of components, wherein the member structure library contains member structure information corresponding to each member category;

the matching unit 22 being configured to retrieve, upon acquiring a reading instruction for data, from the member structure library on the basis of a data identifier carried in the reading instruction for the data, target member structure information matching the data identifier;

the acquisition unit 23 being configured to determine, on the basis of the target member structure information and a structure array identifier contained therein, key description information corresponding to the target member structure information; and the serving unit 24 being configured to take the key description information as a key name of the data.

Optionally, the construction unit comprises a setting subunit and a classification subunit;

the setting subunit being configured to set structure information corresponding to each type of components according to the set data structure template; and the classification subunit being configured to classify the structure information according to member categories contained in the structure information, so as to obtain member structure information corresponding to each member category.

Optionally, the acquisition unit comprises a first judgment subunit, a filling subunit, a second judgment subunit, a splitting processing subunit, a first serving subunit and a second serving subunit;

the first judgment subunit being configured to judge whether the target member structure information contains a structure array identifier;

the filling subunit being configured to fill, if there is first target member structure information containing a structure array identifier, the first target member structure information on the basis of a member serial number contained in a data instruction;

the second judgment subunit being configured to take the filled first target member structure information together with member structure information that does not contain a structure array identifier as second target member structure information, and to judge whether the second target member structure information is dependent on other member structure information;

the splitting processing subunit being configured to split, if the second target member structure information is dependent on other member structure information, the target member structure information on the basis of a start parameter and an end parameter that are contained in the target member structure information, so as to acquire target member substructure information;

the first serving subunit being configured to take the target member substructure information as key description information; and the second serving subunit being configured to take, if the second target member structure information is not dependent on other member structure information, the second target member structure information as key description information.

Optionally, the apparatus further comprises an expansion unit;

the construction unit being configured to construct, upon acquiring a structure expansion instruction carrying a member category and member information, a member structure information table according to the set data structure template and the member category carried in the structure expansion instruction; and the expansion unit being configured to add the member structure information table into the member structure library.

Optionally, the apparatus further comprises an addition unit;

the addition unit being configured to add, upon acquiring an addition instruction carrying target member information, the target member information to the member structure information corresponding to each member category in the member structure library.

Optionally, the apparatus further comprises a deletion unit;

the deletion unit being configured to delete, upon acquiring a deletion instruction carrying target member information, the target member information contained in the member structure information corresponding to each member category in the member structure library.

Optionally, the apparatus further comprises a storage unit;

the storage unit being configured to store the key name of the data into a preset cache area, such that corresponding data can be acquired from a Redis database according to the key name stored in the cache area.

The description of the features in the embodiment corresponding to FIG. 2 can be found in the relevant description of the embodiment corresponding to FIG. 1 and will not be described herein again.

As can be seen from the above technical solution, a member structure library is constructed according to a set data structure template and member categories contained in various types of components, wherein the member structure library contains member structure information corresponding to each member category. The data structure template may be set according to a generic structure of the components. Upon acquiring a reading instruction for data, on the basis of a data identifier carried in the reading instruction for the data, target member structure information matching the data identifier is retrieved from the member structure library. The target member structure information is member structure information that is obtained by unified planning on the basis of the data structure template. Since the target member structure information corresponding to different components differs, when the member structure library is constructed, a structure array identifier can be set for member structure information having a splitting requirement, and after the target member structure information is acquired, key description information corresponding to the target member structure information can be determined on the basis of the target member structure information and a structure array identifier contained therein, and the key description information is taken as a key name of the data. In the technical solution, the unified management of key names can be achieved on the basis of a generic data structure template. According to the solution, data of an entire structure can be accessed, any one of members therein can also be accessed, and any one of a structure array or members within the element range can even be accessed, such that the access to a Redis database is made easy.

Figure 3:
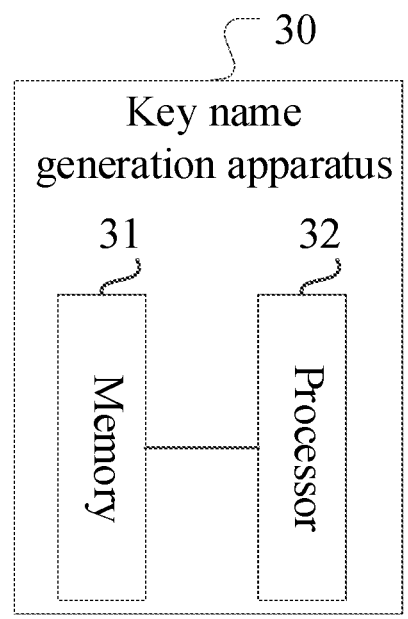
FIG. 3 is a schematic diagram of a hardware structure of a key name generation apparatus provided in an embodiment of the present application.

FIG. 3 is a schematic diagram of a hardware structure of a key name generation apparatus 30 provided in an embodiment of the present application, comprising:

a memory 31, configured to store a computer program; and a processor 32, configured to execute the computer program to implement the steps of any one of the above-mentioned key name generation methods.

Further provided in the embodiments of the present application is a computer-readable storage medium, wherein the computer-readable storage medium stores a computer program thereon, and when the computer program is executed by a processor, the steps of any one of the above-mentioned key name generation methods are implemented.

The key name generation method and apparatus and the computer-readable storage medium provided in the embodiments of the present application are described in detail above. The embodiments in this specification are all described in a progressive manner with each embodiment focusing on differences from the other ones, and the embodiments may be mutually referenced for identical or similar parts. The apparatuses disclosed in the embodiments are described relatively simple since they correspond to the methods disclosed in the embodiments, and the description of the methods may be referenced for the relevant parts. It should be noted that a person of ordinary skill in the art may make a number of improvements and modifications without departing from the principle of the present application, and all these improvements and modifications shall fall within the protection scope of the claims of the present application.

Professionals may further realize that the units and algorithmic steps of each example described with reference to the embodiments disclosed herein can be implemented with electronic hardware, computer software or a combination thereof. In order to clearly illustrate the interchangeability of hardware and software, the composition and steps of each example have been described in the above description in general terms by function. Whether these functions are executed in hardware or software depends on specific applications and design constraints of the technical solutions. Technical professionals may use a different method for each specific application to implement the described functions; however, such implementation should not be considered outside the scope of the present application.

The steps of the method or algorithm described with reference to the embodiments disclosed herein may be implemented directly using hardware, a software module executed by a processor, or a combination thereof. The software module may be placed in a random access memory (RAM), internal storage, read-only memory (ROM), electrically programmable ROM, electrically erasable programmable ROM, register, hard disk, removable disk, CD-ROM, or any other form of storage medium known in the art.

The invention claimed is:

1. A key name generation method, wherein the method comprises:

constructing a member structure library according to a set data structure template and member categories contained in various types of components, wherein the member structure library contains member structure information corresponding to each member category;

upon acquiring a reading instruction for data, retrieving, from the member structure library on the basis of a data identifier carried in the reading instruction for the data, target member structure information matching the data identifier; and determining, on the basis of the target member structure information and a structure array identifier contained therein, key description information corresponding to the target member structure information, and taking the key description information as a key name of the data.

2. The key name generation method according to claim 1, wherein the step of constructing a member structure library according to a set data structure template and member categories contained in various types of components comprises:

setting structure information corresponding to each type of components according to the set data structure template; and classifying the structure information according to member categories contained in the structure information, so as to obtain member structure information corresponding to each member category.

3. The key name generation method according to claim 1, wherein the step of determining, on the basis of the target member structure information and a structure array identifier contained therein, key description information corresponding to the target member structure information comprises:

judging whether the target member structure information contains a structure array identifier;

if there is first target member structure information containing a structure array identifier, filling the first target member structure information on the basis of a member serial number contained in a data instruction;

taking the filled first target member structure information together with member structure information that does not contain a structure array identifier as second target member structure information, and judging whether the second target member structure information is dependent on other member structure information;

if the second target member structure information is dependent on other member structure information, splitting the target member structure information on the basis of a start parameter and an end parameter that are contained in the target member structure information, so as to acquire target member substructure information; and taking the target member substructure information as key description information; and if the second target member structure information is not dependent on other member structure information, taking the second target member structure information as key description information.

4. The key name generation method according to claim 1, wherein the method further comprises:

upon acquiring a structure expansion instruction carrying a member category and member information, constructing a member structure information table according to the set data structure template and the member category carried in the structure expansion instruction; and adding the member structure information table into the member structure library.

5. The key name generation method according to claim 1, wherein the method further comprises:

upon acquiring an addition instruction carrying target member information, adding the target member information to the member structure information corresponding to each member category in the member structure library.

6. The key name generation method according to claim 1, wherein the method further comprises:
upon acquiring a deletion instruction carrying target member information, deleting the target member information contained in the member structure information corresponding to each member category in the member structure library.

7. The key name generation method according to claim 1, wherein the method further comprises:
storing the key name of the data into a preset cache area, such that corresponding data can be acquired from a Redis database according to the key name stored in the cache area.

8. The key name generation method according to claim 1, wherein the data identifier comprises a component type and a member category.

9. A key name generation apparatus, wherein the apparatus comprises:
a memory, configured to store a computer program; and
a processor, configured to execute the computer program to implement steps of a key name generation method, the steps comprising:
constructing a member structure library according to a set data structure template and member categories contained in various types of components, wherein the member structure library contains member structure information corresponding to each member category;
upon acquiring a reading instruction for data, retrieving, from the member structure library on the basis of a data identifier carried in the reading instruction for the data, target member structure information matching the data identifier; and
determining, on the basis of the target member structure information and a structure array identifier contained therein, key description information corresponding to the target member structure information, and taking the key description information as a key name of the data.

10. The key name generation apparatus according to claim 9, wherein the step of constructing a member structure library according to a set data structure template and member categories contained in various types of components comprises:
setting structure information corresponding to each type of components according to the set data structure template; and
classifying the structure information according to member categories contained in the structure information, so as to obtain member structure information corresponding to each member category.

11. The key name generation apparatus according to claim 9, wherein the step of determining, on the basis of the target member structure information and a structure array identifier contained therein, key description information corresponding to the target member structure information comprises:
judging whether the target member structure information contains a structure array identifier;
if there is first target member structure information containing a structure array identifier, filling the first target member structure information on the basis of a member serial number contained in a data instruction;
taking the filled first target member structure information together with member structure information that does not contain a structure array identifier as second target member structure information, and judging whether the second target member structure information is dependent on other member structure information;
if the second target member structure information is dependent on other member structure information, splitting the target member structure information on the basis of a start parameter and an end parameter that are contained in the target member structure information, so as to acquire target member substructure information; and taking the target member substructure information as key description information; and
if the second target member structure information is not dependent on other member structure information, taking the second target member structure information as key description information.

12. The key name generation apparatus according to claim 9, wherein the steps further comprise:
upon acquiring a structure expansion instruction carrying a member category and member information, constructing a member structure information table according to the set data structure template and the member category carried in the structure expansion instruction; and
adding the member structure information table into the member structure library.

13. The key name generation apparatus according to claim 9, wherein the steps further comprise:
upon acquiring an addition instruction carrying target member information, adding the target member information to the member structure information corresponding to each member category in the member structure library.

14. The key name generation apparatus according to claim 9, wherein the steps further comprise:
upon acquiring a deletion instruction carrying target member information, deleting the target member information contained in the member structure information corresponding to each member category in the member structure library.

15. The key name generation apparatus according to claim 9, wherein the steps further comprise:
storing the key name of the data into a preset cache area, such that corresponding data can be acquired from a Redis database according to the key name stored in the cache area.

16. The key name generation apparatus according to claim 9, wherein the data identifier comprises a component type and a member category.

17. A non-transitory computer-readable storage medium, wherein the non-transitory computer-readable storage medium stores a computer program thereon, and the computer program, when executed by a processor, implements steps of a key name generation method, the steps comprising:
constructing a member structure library according to a set data structure template and member categories contained in various types of components, wherein the member structure library contains member structure information corresponding to each member category;
upon acquiring a reading instruction for data, retrieving, from the member structure library on the basis of a data identifier carried in the reading instruction for the data, target member structure information matching the data identifier; and
determining, on the basis of the target member structure information and a structure array identifier contained therein, key description information corresponding to the target member structure information, and taking the key description information as a key name of the data.

18. The non-transitory computer-readable storage medium according to claim 17, wherein the step of constructing a member structure library according to a set data structure template and member categories contained in various types of components comprises:
setting structure information corresponding to each type of components according to the set data structure template; and
classifying the structure information according to member categories contained in the structure information, so as to obtain member structure information corresponding to each member category.

19. The non-transitory computer-readable storage medium according to claim 17, wherein the step of determining, on the basis of the target member structure information and a structure array identifier contained therein, key description information corresponding to the target member structure information comprises:
judging whether the target member structure information contains a structure array identifier;
if there is first target member structure information containing a structure array identifier, filling the first target member structure information on the basis of a member serial number contained in a data instruction;
taking the filled first target member structure information together with member structure information that does not contain a structure array identifier as second target member structure information, and judging whether the second target member structure information is dependent on other member structure information;
if the second target member structure information is dependent on other member structure information, splitting the target member structure information on the basis of a start parameter and an end parameter that are contained in the target member structure information, so as to acquire target member substructure information; and taking the target member substructure information as key description information; and
if the second target member structure information is not dependent on other member structure information, taking the second target member structure information as key description information.

20. The non-transitory computer-readable storage medium according to claim 17, wherein the steps further comprise:
upon acquiring a structure expansion instruction carrying a member category and member information, constructing a member structure information table according to the set data structure template and the member category carried in the structure expansion instruction; and
adding the member structure information table into the member structure library.

* * * * *